Aug. 20, 1946.  J. M. HAIT  2,406,289
AMPHIBIAN
Filed May 27, 1943  5 Sheets-Sheet 1
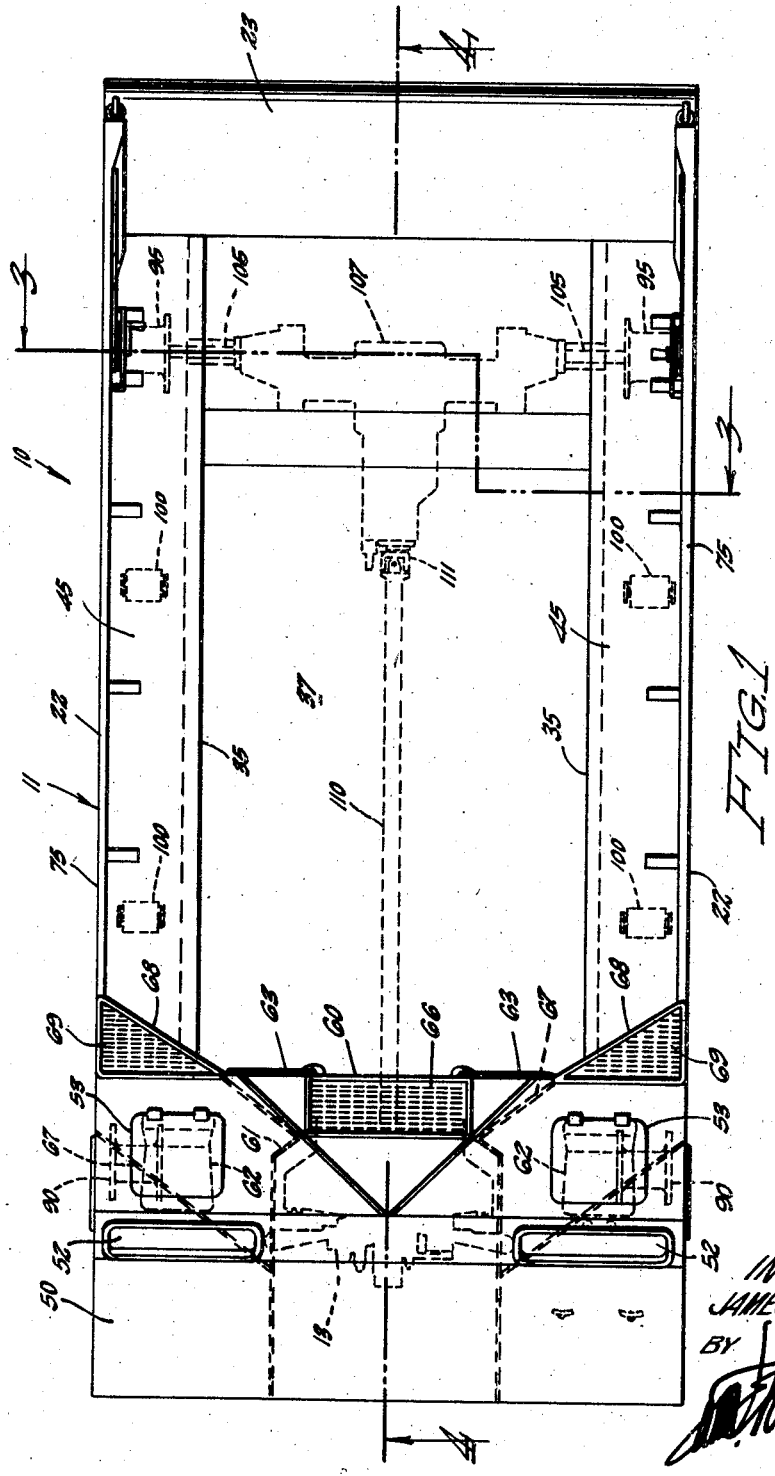
INVENTOR:
JAMES M. HAIT
BY
ATTORNEY

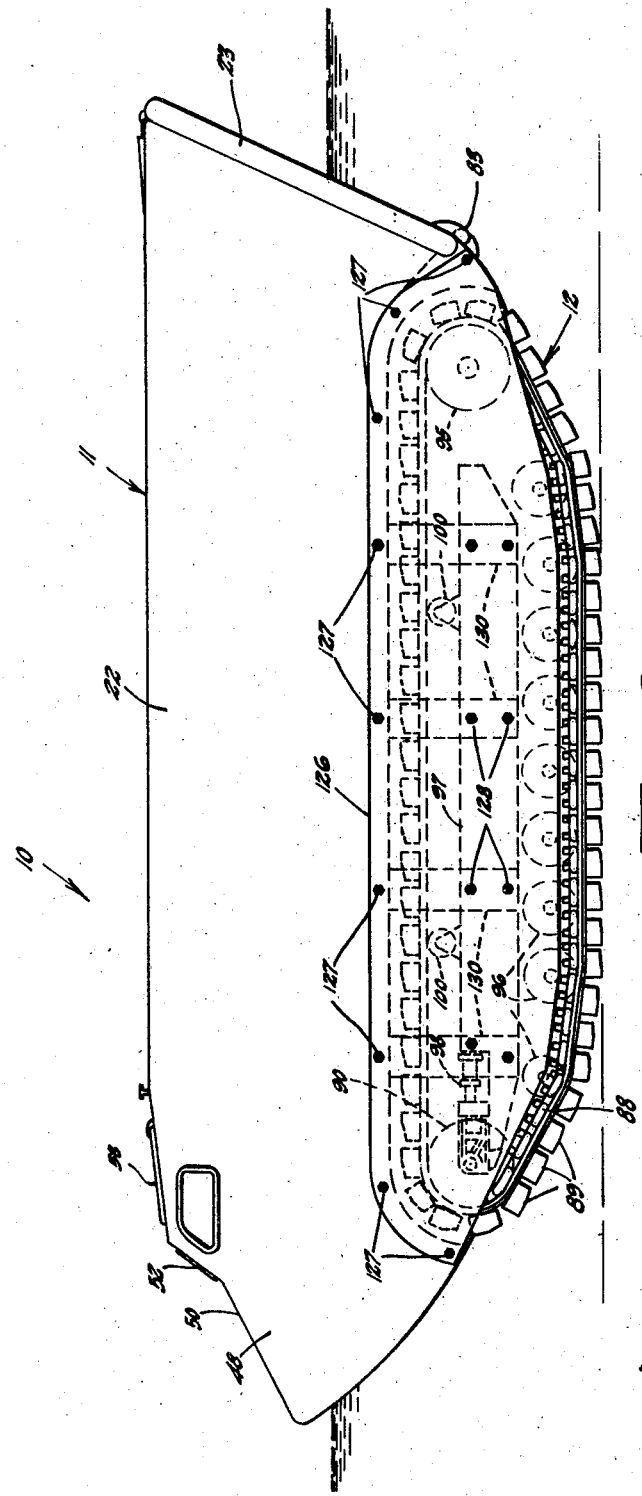

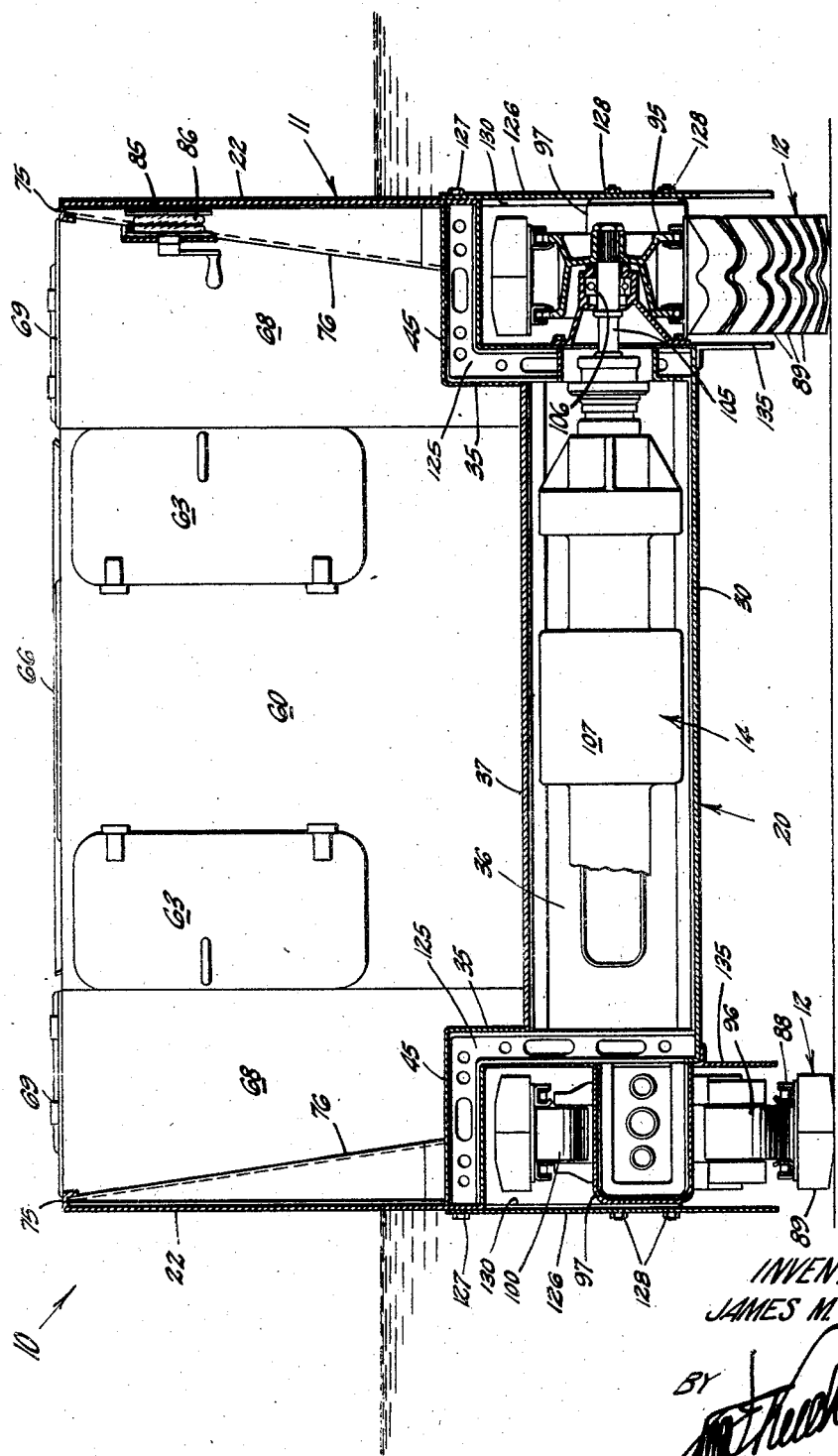

Aug. 20, 1946.   J. M. HAIT   2,406,289
AMPHIBIAN
Filed May 27, 1943   5 Sheets-Sheet 4
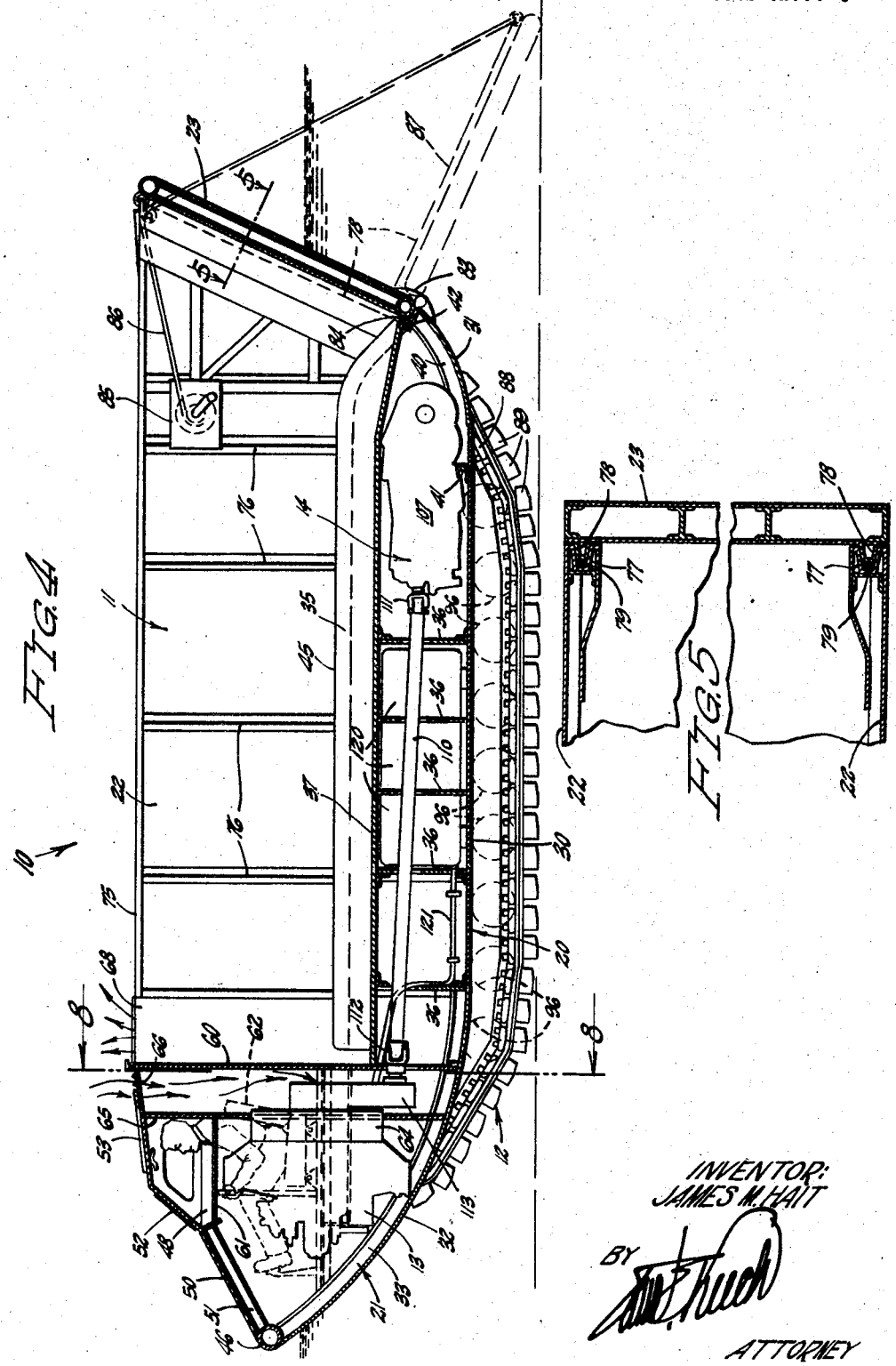
INVENTOR:
JAMES M. HAIT
BY
ATTORNEY Aug. 20, 1946.          J. M. HAIT                 2,406,289
                        AMPHIBIAN
                    Filed May 27, 1943          5 Sheets-Sheet 5
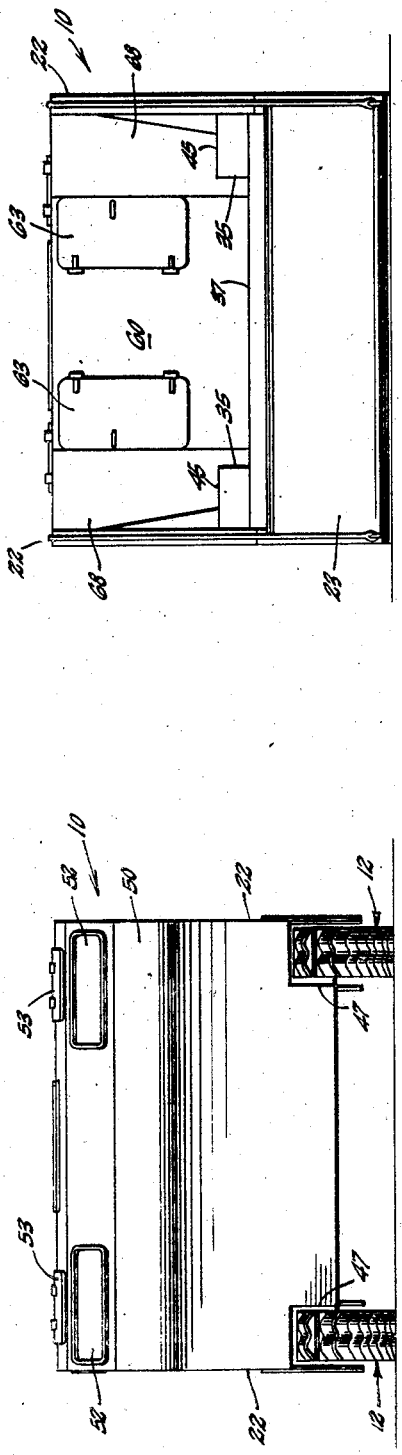
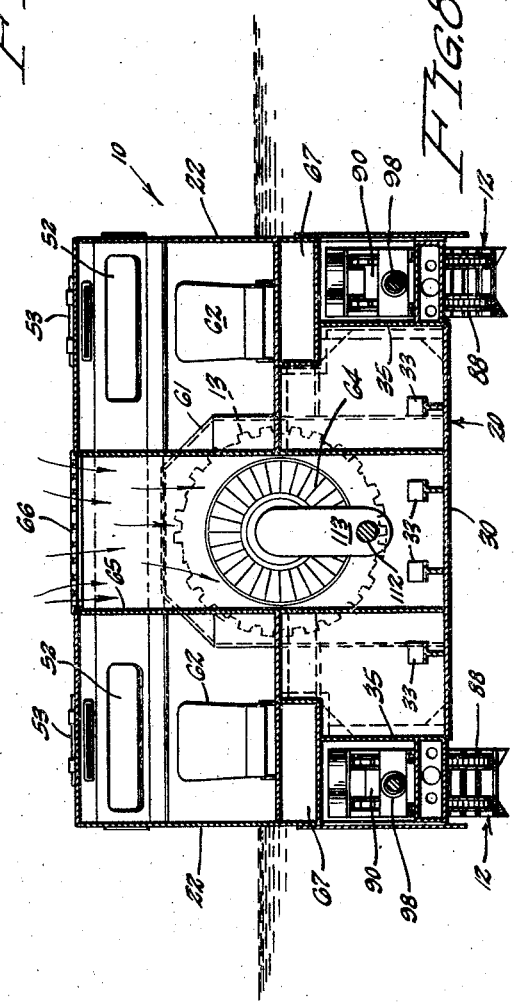
INVENTOR:
JAMES M. HAIT
BY
ATTORNEY Patented Aug. 20, 1946

2,406,289

UNITED STATES PATENT OFFICE 2,406,289

AMPHIBIAN

James M. Hait, San Gabriel, Calif., assignor to Food Machinery Corporation, San Jose, Calif., a corporation of Delaware Application May 27, 1943, Serial No. 488,685

11 Claims. (Cl. 115—1)

This invention relates to amphibians and has particular utility in cargo-carrying amphibians employing track laying mechanisms on opposite sides thereof for supporting the amphibian on land and propelling it on land or in the water.

Amphibians of this general type must be relatively short to permit them to turn readily by operating their track laying mechanisms at differential speeds. To accommodate the load these amphibians are designed to carry, the cargo compartment in the ship of necessity has to be fairly deep, with its floor well below the water level. All loading or unloading of cargo has been done by lifting the cargo over the gunwale of the ship.

It is an object of this invention to provide a cargo carrying amphibian in the hull of which a door is provided which opens directly from the cargo carrying compartment to the exterior of the ship and which permits the loading of cargo into said compartment or the unloading of cargo therefrom with a minimum of labor.

Heretofore the cargo carrying space and carrying capacity of amphibians has been relatively small as compared to the size and weight of the amphibian itself.

It is an object of my invention to very substantially increase the cargo space and carrying capacity of such amphibians in proportion to the size and weight of the latter.

It is another object of my invention to provide such an amphibian in which the center of gravity is relatively low, in which splash ordinarily produced by grousers on the track laying mechanisms is eliminated and in which these features are obtained while at the same time providing a strong, rugged structure in the ship and a proper fore and aft balance in the ship so that it will be well trimmed whether travelling light or heavy.

In amphibian construction it is highly desirable to have a box structure in at least one end of the ship. Where the ship has a door at its rear end, as is preferable in the present invention, it is highly desirable to provide a heavy transverse bulkhead joining the side walls of the ship and spaced backwardly from the bow.

It is another object of the invention to provide such a bulkhead which is relatively close to the bow of the ship and yet have this bulkhead form the front bulkhead of the cargo carrying compartment.

It is another object of this invention to provide such a ship with the engine located between the bow and the front bulkhead and still have ample space for dual pilots between the bow and the front bulkhead.

Yet another object of the invention is to provide such a ship in which the engine so provided is air-cooled and in which means is provided for withdrawing air from the atmosphere, circulating it about the engine, and returning this air to the atmosphere without the necessity for its going through the cargo compartment so that the latter may be filled with cargo without impeding the circulation of air for the engine.

In track laying amphibians heretofore produced the track laying mechanisms occupied a considerable portion of the space at the sides of the ship and the cargo compartment was entirely disposed in between these mechanisms.

It is a still further object of my invention to provide a cargo carrying amphibian in which the track laying mechanisms are disposed below the cargo compartment, permitting a substantial increase in the width of the latter without widening the ship.

The manner of accomplishing the foregoing objects, as well as further objects and advantages, will be made manifest in the following description taken in connection with the accompanying drawings in which:

Fig. 1 is a plan view of a preferred embodiment of the invention.

Fig. 2 is a side elevational view of Fig. 1.

Fig. 3 is a transverse sectional view taken on the line 3—3 of Fig. 1.

Fig. 4 is a longitudinal sectional view taken on the line 4—4 of Fig. 1.

Fig. 5 is a diagrammatic sectional view taken on the line 5—5 of Fig. 4, and illustrating the tongue and groove connection preferably provided between the end door and side walls of the amphibian of my invention.

Fig. 6 is a reduced scale front elevational view of the invention.

Fig. 7 is a rear elevational view of Fig. 6 with the amphibian resting on land and the end door opened.

Fig. 8 is a transverse sectional view taken on the line 8—8 of Fig. 4.

Referring specifically to the drawings, my invention is there shown as embodied in an amphibian 10 including a hull 11, two track laying mechanisms 12, an engine 13 and a power transmission 14 for transmitting power from said engine to said track laying mechanisms.

The hull 11 includes a relatively rigid bottom structure 20, a box-like bow structure 21, sides 22 and a stern door 23.

The hull bottom structure 20 includes a bottom plate 30 having an upwardly curving portion 31 at the stern and an upwardly curving portion 32 at the bow which forms the bow plate of the bow structure 21. The bottom structure 20 also has fore-and-aft T-section ribs 33 which are preferably welded to the bottom plate 30 and extend forwardly into the bow structure 21 where they conform to and are welded to the bow plate 32. The bottom structure 20 also has side plates 35 which are connected by transverse stiffening plates 36, the upper edges of which are preferably united with a cargo deck 37. The stern bottom section 31 is reinforced by girders 40, the front ends of which are united with a transverse angle 41 and the rear ends of which are united with a transverse angle 42 to which the rear ends of the bottom section 31 and the deck 37 are also united.

As shown in Fig. 3, the cargo deck 37 has a step 45 formed therein along each side of the ship which extends laterally beyond the side plates 35 of the bottom structure and over the track laying mechanisms 12.

In the bow structure 21 the bow plate 32 and the bow ribs 33 extend forwardly and upwardly to unite with a tubular bow beam 46 and are united with forward extensions 47 of the bottom structure side plates 35 and with forward extensions 48 of the hull sides 22. A bow deck 50 reinforced by ribs 51 and shaped to accommodate windows 52 and escape hatches 53, extends upwardly from the bow beam 46 to unite with the upper edge of a transverse bulkhead 60, the latter extending entirely across the ship and being rigidly united with the bottom structure 20 and the hull sides 22.

As clearly shown in Figs. 1 and 4, the engine 13 is mounted in the bow structure 21 forward of the bulkhead 60. It would be impractical to do this in amphibians of the prior art and still provide suitable cabin space for dual pilots. The provision of adequate space in the bow structure for this purpose is provided in the amphibian of my invention by greatly reducing the depth of the track laying mechanisms 12, mounting these on the rigid bottom structure 20 of the ship instead of on the sides of the ship as was formerly the practice, and then extending the sides laterally to the full beam of the craft throughout its length.

This provides room in the bow structure 21 for a housing 61 for the engine 13 and leaves ample space on opposite sides of this housing for the two pilots, chairs 62 for the pilots being mounted opposite the windows 52 (see Figs. 1, 4 and 8). The pilots normally have access to their operating stations in the bow structure through doors 63 in the bulkhead 60. When these doors are blocked by cargo carried on the deck 37 the pilots may enter and leave their operating stations through the escape hatches 53.

Although various types of power plants can be used in the amphibian 10, the engine 13 is preferably a radial cylinder internal combustion engine of the type commonly used in airplanes, and is preferably air-cooled. The engine embodies a fan 64 which is shown diagrammatically in Figs. 4 and 8 as being suitably housed so that air sucked axially into the fan from the rear is discharged forwardly around the cylinders of the engine so as to cool these.

Built into the bow structure 21 is a sheet metal conduit 65 having an air intake grid 66 in the deck 50 adjacent the bulkhead 60 which conducts air from the outside atmosphere to the engine fan 64. The air thus used for cooling is discharged from around the cylinders of the engine 13 into the interior of the engine housing 61 and escapes from this through conduits 67, which extend diagonally rearwardly therefrom as shown in Figs. 1 and 8, and through triangular ducts 68 formed in the corners between the bulkhead 60 and sides 22, to be discharged through grids 69.

The hull sides 22 extend upwardly from the outer edges of the side steps 45 formed in the cargo deck 37, these sides being preferably only the thickness of a single sheet of metal and being reinforced by rails 75 and ribs 76. The stern edges of the sides 22 preferably incline rearwardly and are provided with grooves 77 (see Fig. 5) into which tongues 78 on opposite side edges of the door 23 are adapted to enter and compress a strip of packing 79 therein.

The door 23 is connected at its lower edge by hinges 83 to the stern bottom section 31. A strip of packing material 84 mounted in the angle 42, unites at its ends with the packing material 79 and is compressed between the lower edge of the door 23 and the angle 42 when the door is closed, thereby making a complete sea-tight seal between the bottom and side edges of the door and the rest of the hull.

Mounted on the sides 22 are suitable winches 85 which are connected by cables 86 to the door 23. These winches are adapted to raise the door 23 and hold this in its closed position in which it is shown in full lines in Fig. 4, or to lower this door into contact with the ground when the amphibian 10 is resting on land as shown by broken lines 87 in this figure.

The track laying mechanisms 12 of the amphibian 10 of my invention, in contrast to those employed on amphibians in the prior art, are designed to occupy a space of a minimum height and are mounted on opposite side edge portions of the bottom structure 20 of the amphibian hull so that each of these track laying mechanisms is entirely disposed beneath the water line whenever the amphibian is afloat. This produces many advantages, some of which have already been pointed out, another advantage which will be explained more fully hereinafter being the simplification of the means for transmitting power from the engine to the track laying mechanisms so as to differentially drive these at will.

Still another advantage of this feature is that the track laying mechanisms 12 may be provided with a very strong and rugged mounting extending laterally from a relatively rigid bottom structure such as the structure 20, and at the same time relieve the rest of the hull 11 from participation in the function of supporting the track laying mechanisms 12 when the amphibian 10 is afloat as well as from transmitting to these mechanisms the weight of the amphibian and the shocks and strains incidental to the latter travelling on land.

Each of the track laying mechanisms 12 includes an endless belt 88 which may be of link construction or of reinforced rubber or of any other suitable material and construction, this belt having mounted on the outer face thereof an endless series of grousers 89 which rest on the ground and support the amphibian when it is travelling on land and which are preferably built with such a shape that when the amphibian 10 is afloat it will be propelled relatively efficiently through the water by the action of the grousers 89 thereagainst.

Each belt 88 is trained about an idle sprocket 90 and a drive sprocket 95. The lower flights of these two belts form tracks which support the amphibian 10 when the latter is travelling on land. This is effected through a series of bogie wheels 96 which are mounted in any suitable manner on the bottom of a very strong base 97, which is rigidly fixed on and extends laterally from the hull bottom structure 20.

The idle sprocket 99 is shiftably mounted on the forward end of the base 97 as shown in Fig. 2 and is adjustable in a fore-and-aft direction thereon by means of a jack 98. The upper run of the belt 88 of each mechanism 12 is supported at intervals by rollers 100 journalling in brackets provided on the base 97.

The drive sprocket 95 of each mechanism 12 is mounted on an axle 105 which extends laterally through a suitable packed bearing 106 mounted in one of the bottom structure side plates 35. The axles 105 connect with a gear box 107 of the transmission 14, this gear box being preferably of the differential type and also one providing gear mechanism for varying the drive ratio of the power transmitted to the axles 105 or for reversing the latter. The gear box 107 is preferably one of the well known types in common use at present in land military tanks being produced in the United States.

Owing to the greatly decreased over-all height of the track laying mechanisms 12 it is possible to mount the gear box 107 directly on the hull bottom plate 30 and provide a relatively smooth deck 37 without the necessity of the bilge space in between the bottom plate and the deck having an excessive depth.

Besides the gear box 107 the power transmission 14 includes a drive shaft 110 which connects through a universal joint 111 with the gear box 107 and through a universal joint 112 with a power take-off 113 which extends downwardly from the engine 13 just forward of the bulkhead 60.

Ample space is provided in the bilge to accommodate fuel storage tanks 120 from which the fuel may be conducted to the engine 13 through a pipe line 121. It is to be noted that the bulkhead 60 is pierced only to allow the passage of the universal joint 112 and the fuel line 121 therethrough and to connect the lower ends of the air conduits 67 with the air ducts 68.

The step portions 45 of the deck 37 are rigidly united with the bottom structure 20 by a supplemental angular frame structure 125 embodied with opposite side portions of the bottom structure. The track laying mechanisms 12 are covered on the outside and the deck steps 45 and hull sides 22 are braced by downward side extension plates 126 which are united as by bolts 127 and 128 to the lower edges of the sides 22 and to the base structures 97. The plates 126 are preferably provided with reinforcing panels 130 welded to the inner faces thereof for increasing the compression stresses which plates 126 can endure.

In some cases it is found preferable to have the plates 126 extend downwardly below the base structures 97, and to provide corresponding guard plates 135 on the bottom structure 20 to guard the lower flights of the belts 88. I have found, however, that in many operations it is quite practical to dispense with these guards.

The amphibian 10 is adapted particularly for travel on land or water in amphibious warfare. It is of great importance in such operations that the splash caused by the grousers on the track laying mechanisms be reduced to render it more difficult for the enemy to detect the presence of our amphibians. In the amphibian 10 I have entirely eliminated grouser splash by submerging both upper and lower runs of the track belts of the track laying mechanisms. This I have done in accordance with the principles set forth in my co-pending application for U. S. Letters Patent Serial No. 426,030, filed January 8, 1942, on Amphibian, whereby the upper submerged run of grousers is housed over to substantially eliminate the counter propulsive effect which otherwise would be produced by this.

Added to the many advantages of my invention pointed out hereinabove is the relatively low center of gravity attained in the amphibian 10 as compared with the prior art practice. This is accomplished by the greatly lowered center of gravity of the track laying mechanisms 12 and their mountings and the driving of these mechanisms through a gear box 107 (which is a relatively heavy item of equipment) with this gear box placed almost directly on the bottom plate of the hull and close to the stern of the ship. The lowering of the center of gravity is also aided by the reduction of the weight of the sides of the hull which previously have constituted fairly bulky and heavy pontoons which in the present invention are of a single thickness of sheet metal construction.

While the engine 13 is not disposed at as low a level as it is possible to place this, the type of engine used weighs approximately less than one-half as much as the gear box 107.

The preservation of clean lines in the cargo-carrying space above the deck 37 and surrounded by the bulkhead 60, sides 22 and door 23, has been made possible by use of the power take-off 113 for delivering power from the engine 13 downwardly to such a level that the drive shaft 110 can directly connect the engine with the gear box 107 without the necessity of deforming the plane surface of the deck 37.

Another advantage possessed by the amphibian 10 is the certainty of a free flow of cooling air to and from the engine 13 through the grids 66 and 69, regardless of whether or not cargo fills the forward end of the cargo space adjacent the bulkhead 60.

The door 23 also renders it possible to load or unload the amphibian 10 while resting on land, with relatively little effort, merely by lowering the door 23 to its broken line position 87, in which it may be used as a ramp either to deliver cargo into the amphibian or to discharge this therefrom.

What I claim is:

1. In an amphibian the combination of: a hull including a rigid bottom structure, a box-like bow structure and sides; track laying mechanisms mounted on opposite lateral edges of said bottom structure beneath and inwardly from said sides; a door hingedly connected to the rear end of said bottom structure; means for integrating said door and said sides and to form a sealing closure for the space between the rear ends of said bottom structure and said sides when said door is closed; means for closing said door or opening the same and permitting it to swing downwardly to form a ramp to assist in the loading or unloading of cargo from said amphibian; and power means provided on said amphibian for differentially actuating said track laying mechanisms.

2. An amphibian comprising: a hull having a bottom structure, a box-like bow structure and side and stern extending upwardly from rear and lateral portions of said bottom structure to enclose a cargo compartment, said bow structure including a transverse bulkhead joining forward portions of said sides and providing the forward bulkhead of said compartment; track laying mechanisms mounted rigidly on opposite side edges of said bottom structure, a cargo compartment deck covering said bottom structure and said track laying mechanisms and leaving a space within a major portion of the depth of said sides free from encumbrance by said track laying mechanisms for the accommodation of cargo; and power means provided on said hull for driving said track laying mechanisms differentially.

3. In an amphibian the combination of: a hull including a rigid bottom structure; track laying mechanisms mounted on opposite sides of said bottom structure; deck means overlying said bottom structure and said track laying mechanisms and forming the deck of a cargo compartment, said deck being below the water line when the ship is afloat; bow, side, and stern means on said hull and rising from said bottom structure upwardly above said water line to enclose said cargo compartment and render said amphibian buoyant; and power means on said hull for differentially actuating said track laying mechanisms.

4. In an amphibian the combination of: a hull including a rigid bottom structure; track laying mechanisms mounted on opposite sides of said bottom structure; deck means overlying said bottom structure and said track laying mechanisms and forming the deck of a cargo compartment, said deck being below the water line when the ship is affoat; bow, side and stern means on said hull and rising from said bottom structure upwardly above said water line to enclose said cargo compartment and render said amphibian buoyant, said bow means comprising a box-like structure including a transverse bulkhead adjacent said cargo compartment; an engine in said bow structure forward of said bulkhead; gear means under said deck adjacent the stern of the ship and connected to said track laying mechanisms for differentially driving the same; and means for transmitting power from said engine to said gear means.

5. A combination as in calim 4 in which said engine is a radial cylinder internal combustion enginge, and in which said power transmission means includes an offset power takeoff extending downwardly from said engine, and a shaft disposed beneath said deck and connecting said takeoff to said gear means.

6. In an amphibian, the combination of: a rigid hull bottom structure; track laying mechanisms mounted on said bottom structure along opposite sides thereof; bow, side and stern means on said hull bottom structure, said bow means comprising a box-like structure including a transverse bulkhead joining said hull side means; a cargo deck provided on said bottom structure and located beneath the water line of the ship when the latter is afloat; an engine disposed in said bow box structure forward of said bulkhead; and transmission means disposed beneath said deck for connecting said engine to said mechanisms for differentially driving the latter.

7. In an amphibian, the combination of: a rigid hull bottom structure; track laying mech- anisms mounted on said bottom structure along opposite sides thereof; bow, and side means and a stern door provided on said hull bottom structure, said bow means comprising a box-like structure including a transverse bulkhead joining said hull side means; a cargo deck provided on said bottom structure and located beneath the water line of the ship when the latter is afloat; an engine disposed in said bow box structure forward of said bulkhead; and transmission means disposed beneath said deck for connecting said engine to said mechanisms for differentially driving the latter.

8. In an amphibian the combination of: a hull including a rigid bottom structure; track laying mechanisms mounted on opposite sides of said bottom structure; deck means overlying said bottom structure and said track laying mechanisms and forming the deck of a cargo compartment; bow, side, and stern means on said hull and rising from said bottom structure upwardly above said deck means to enclose said cargo compartment and render said amphibian buoyant; and power means on said hull for differentially actuating said track laying mechanisms.

9. In an amphibian the combination of: a hull including a rigid bottom structure; track laying mechanisms mounted on opposite sides of said bottom structure; deck means overlying said bottom structure and said track laying mechanisms and forming the deck of a cargo compartment; bow, side and stern means on said hull and rising from said bottom structure upwardly above said deck means to enclose said cargo compartment and render said amphibian buoyant, said bow means comprising a box-like structure including a transverse bulkhead adjacent said cargo compartment; an engine in said bow box structure forward of said bulkhead; gear means under said deck adjacent the stern of the ship and connected to said track laying mechanism for differentially driving the same; and means for transmitting power from said engine to said gear means.

10. In an amphibian, the combination of: a rigid hull bottom structure; track laying mechanisms mounted on said bottom structure along opposite sides thereof; bow, side and stern means on said hull bottom structure, said bow means comprising a box-like structure including a transverse bulkhead joining said hull side means; a cargo deck provided on said bottom structure; an engine disposed in said bow box structure forward of said bulkhead; and transmission means disposed beneath said deck for connecting said engine to said mechanism for differentially driving the latter.

11. In an amphibian, the combination of: a rigid hull bottom structure; track laying mechanisms mounted on said bottom structure along opposite sides thereof; bow, and side means and a stern door provided on said hull bottom structure, said bow means comprising a box-like structure including a transverse bulkhead joining said hull side means; a cargo deck provided on said bottom structure; an engine disposed in said bow box structure forward of said bulkhead; and transmission means disposed beneath said deck for connecting said engine to said mechanisms for differentially driving the latter.

JAMES M. HAIT.